METHOD FOR MEASURING THE COAGULATION TIME OF ORGANIC SUBSTANCES (AND ALBUMINOID LIQUIDS), SUCH AS BLOOD, AND APPARATUS FOR CARRYING OUT SUCH A METHOD

Original Filed Sept. 22, 1967 2 Sheets-Sheet 1

METHOD FOR MEASURING THE COAGULATION TIME OF ORGANIC SUBSTANCES (AND ALBUMINOID LIQUIDS), SUCH AS BLOOD, AND APPARATUS FOR CARRYING OUT SUCH A METHOD

Original Filed Sept. 22, 1967 2 Sheets-Sheet 2

United States Patent Office

Re. 28,009
Reissued May 14, 1974

28,009

METHOD FOR MEASURING THE COAGULATION TIME OF ORGANIC SUBSTANCES (AND ALBUMINOID LIQUIDS), SUCH AS BLOOD, AND APPARATUS FOR CARRYING OUT SUCH A METHOD

Guido Vicario, Piazza Giulio Cesare 14, Milan, Italy

Original No. 3,511,084, dated May 12, 1970, Ser. No. 669,804, Sept. 22, 1967. Application for reissue Jan. 27, 1971, Ser. No. 110,439
Claims priority, application Italy, Oct. 3, 1966, 28,427/66
Int. Cl. G01n *33/16*
U.S. Cl. 73—64.1 12 Claims

Matter enclosed in heavy brackets [ ] appears in the original patent but forms no part of this reissue specification; matter printed in italics indicates the additions made by reissue.

ABSTRACT OF THE DISCLOSURE

A method for measuring the coagulation time of albuminoid substances and liquids, such as blood, characterized by utilizing the intercepting property of a light beam on a photoelectric cell from liquid state blood (with respect to a light beam which is to periodically pass through it); the test-tube being at a horizontal position during the firing of said beam, and at a vertical position for the remaining cycle period, which will continue until, on clot being achieved, the blood remains on the bottom of the test-tube and the light beam by passing therethrough will cause the apparatus to be stopped and provide a signal for the exact time taken for coagulation.

Hitherto adopted methods are known for measuring the rate of coagulation, such as for blood, extensively used for clinical tests; generally, they contemplate a naked-eye observation of the sample as made at a certain frequency (for example, one observation a minute) until coagulation is achieved.

This prior system and control method suffer from substantial disadvantages, the most serious among which being: the waste of time and unaccuracy of the final results.

It is the object of this invention to provide a novel method for measuring the coagulation time and other similar or additional tests. Concomitantly, it is the object of the invention also to provide an apparatus for practising it.

The method utilizes a periodical light beam passing through the test-tube at a horizontal position, in combination with a photoelectric cell connected to a time indicator, normally the test-tube being at a vertical position, adapted however to take a horizontal position at determined intervals of time with a rocking movement, that is when scanning by said light beam.

It is apparent that as long as the liquid in the test-tube is such, the light beam will be intercepted and the apparatus will continue its operation. When said liquid is coagulated, remaining on the bottom of the test-tube even when the latter takes a horizontal position, the light beam will pass and strike the photoelectric cell, thus arrestnig the time indicator and entire apparatus.

In practice, it is desirable that each oscillation of the test-tube occur at intervals of one minute, whereas the same takes a time of about ten seconds. The interval of one minute is not to be intended as limitation, since a different time unit could be also set.

Of course, since coagulation time starts from drawing from a patient's body, this advance is to be taken into account and, therefore, the apparatus is provided with a pushbutton pressed by the operator concomitantly upon drawing, even if between said drawing and test-tube insertion in position and scanning start there will elapse from one to two minutes, which are therefore counted.

In practice, the operator has first to effect drawing and at the same time to press the starting time indicator pushbutton; secondly, he will have to press a second pushbutton starting the rocking device members, that is the periodical oscillation for the swinging head, wherein the seating is accommodated for the test-tube at a vertical position, and transversely thereto provision being made for a lamp on one side and a photoelectric cell on the other side, the two axes, test-tube seating and photoelectric cell, intercepting each other at right angles. Of course, the device will be designed in such a manner that at inoperative condition said test-tube seating is always at a vertical position.

The apparatus embodying the above method comprises in combination: a time indicator formed of a motor driving a hand or pointer rotating through 360° in sixty minutes, said indicator being of a known type; a rocking unit containing the test-tube seating and a detecting unit transversely to the former and formed of a lamp and a photoelectric cell; a motor on the shaft of which a cam is keyed and performs a revolution per minute; an eccentric keyed on the shaft of said rocking unit and operated by said cam; a microswitch actuated by a fixed stake when said rocking unit has attained its horizontal position and which puts on the lamp; incorporated means for heating said rocking unit to maintain a desired temperature; and means for regularly continuing the cycle until coagulation is achieved.

The apparatus, as briefly disclosed, may be an element of a battery of a number of apparatuses, all or part of which may operate, individually acting for their own.

In the following detailed description reference is made to the accompanying drawings in which the apparatus is shown according to a non-restrictive embodiment thereof, the members and components being such that they may be differently arranged and modified, yet attaining the same aims.

Figure 1:
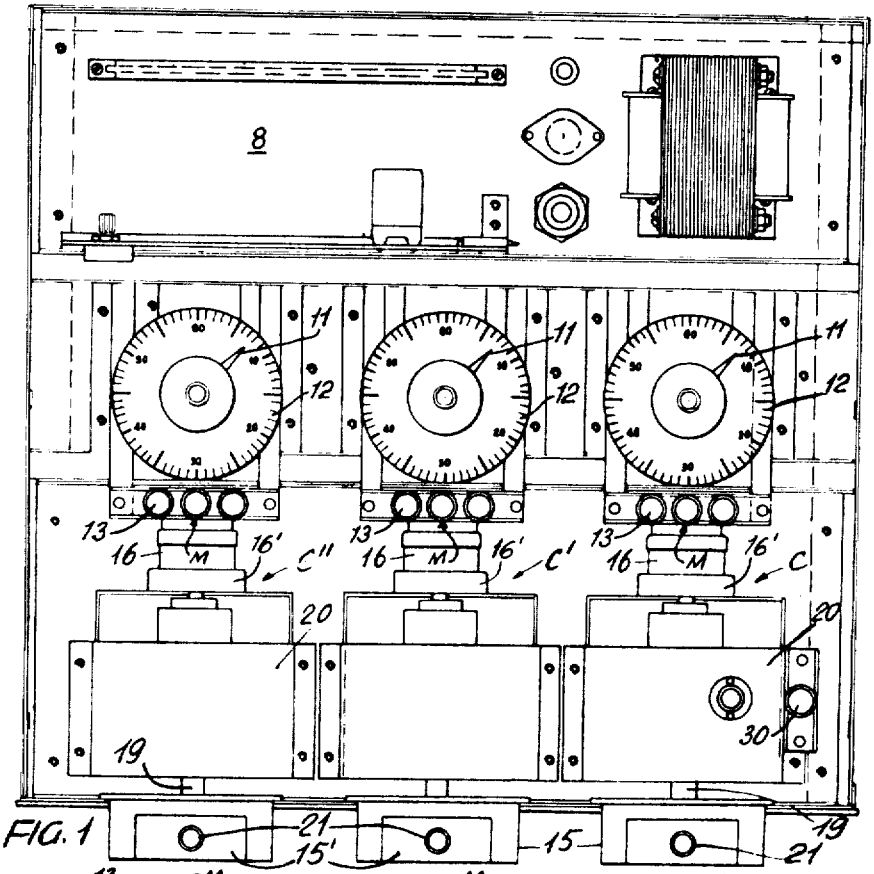
FIG. 1 is a plan view showing a set of three apparatuses according to the invention.
Figure 2:
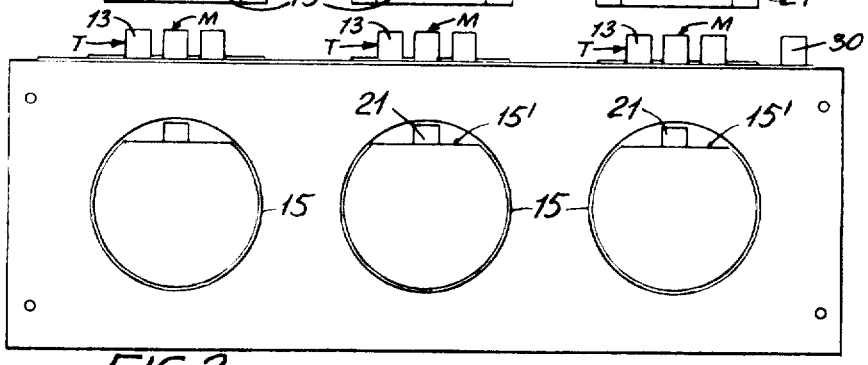
FIG 2 is a front view of FIG. 1.
Figure 3:
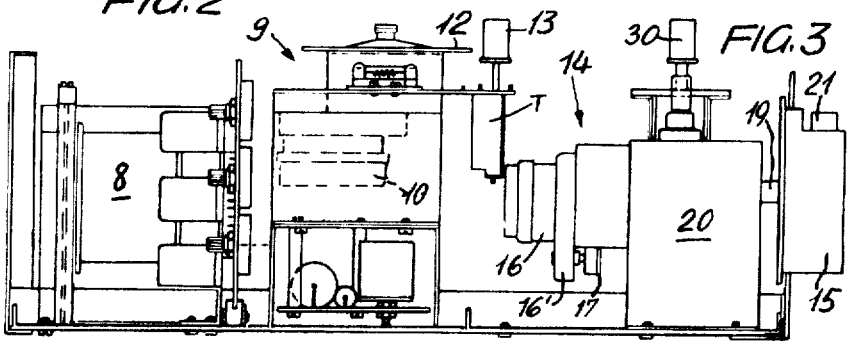
FIG. 3 is a side view of FIG. 2.

Particularly referring to FIGS. 1, 2 and 3, there is shown a set of three clot meters C, C', C'' joined into a single assembly including a rear zone 8, wherein common instruments are arranged. Each instrument or apparatus comprises: a time indicator 9 formed of a synchronous motor 10 driving a hand or pointer 11 performing a complete revolution on the indexed disc 12 in an hour, starting for motor 10 being controlled by pushbutton 13. Time indicator 9 carries on its shaft the unit 14 controlling the swinging head 15; the former is formed of motor 16 coupled, as seen in FIGS. 4–6, a reduction gear 16', a cam 17, performing a revolution per minute, being keyed on the spindle of said reduction gear 16'; on rotating, cam 17 will encounter sprocket 18 eccentrically keyed to the inner end of shaft 19, with the other end of which, projecting from support 20, said swinging head 15 is fast, which head will therefore follow the alternate rocking movements imparted from cam 17 to sprocket 18.

Head 15 is in the form of a cylindrical disc having an upper horizontal groove 15' on the axis of which provision is made for the cylindrical seating 21 wherein said test-tube is inserted.

Figure 6:
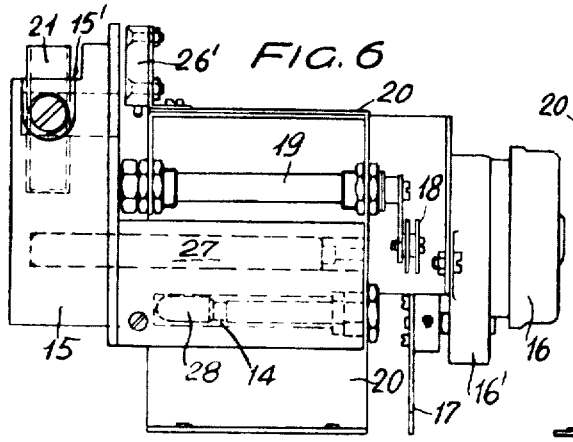
FIG. 6 is a side view of FIG. 4.
Figure 5:
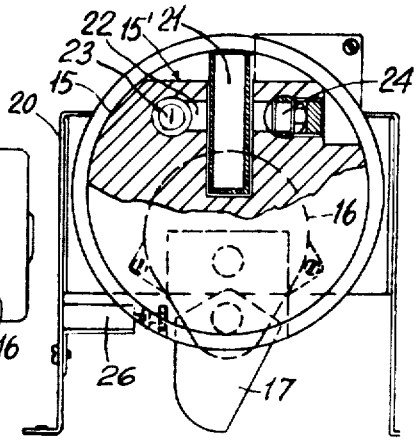
FIG. 5 is a partially cut away front view of FIG. 4.
Figure 4:
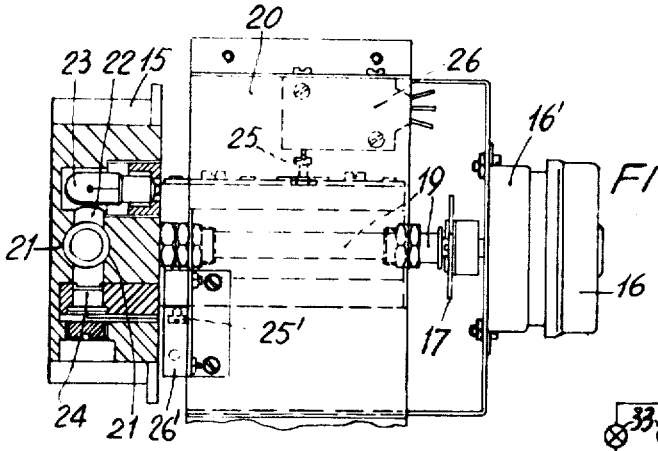
FIG. 4 is a fragmentary plan view of an element in enlarged scale and partially cut away.

At right angles to said seating there is provided, as seen in FIGS. 4–6, a conduit 22 communicating on one side with a chamber wherein lamp 23 is accommodated, and on the other side (of seating 21) with a recess for photoelectric cell 24.

Head 15 may take two positions at right angles to each other, therefore an angular displacement of 90° as limited by the encounter of two adjustable pushbuttons for vertical and horizontal positions 25 and 25', as seen in FIG. 4, respectively, with the corresponding microswitches 26 and 26'. When rotating on the horizontal position, the encounter of pushbutton 25' with microswitch 26' will cause lamp 23 to be put on for a time of about one second, sufficient for scanning through the test-tube occupying sealing 21; if at liquid condition, the blood will intercept the light beam of lamp 23 and the cycle will proceed. When blood is coagulated, remaining on the bottom of the test-tube, it will enable light beam to pass, which light beam by striking the photoelectric cell 24 will cause the clot meter to be arrested.

Head 15 is further provided with a resistor 27 for heating said head and keeping it at a constant temperature of 37° C. with the aid or mercury double contact thermometer 28 providing to disconnect supply for resistor (and therefore heating) on attainment of 37° C. through a relay with transistor amplifier.

Figure 7:
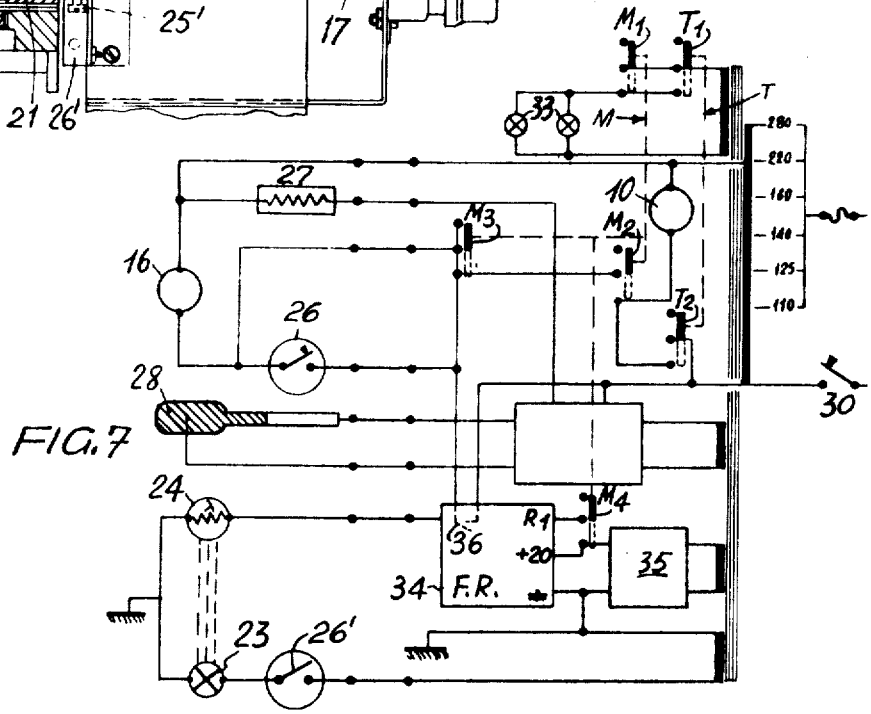
FIG. 7 shows the wiring diagram of the apparatus.

FIG. 7 shows the wiring diagram to which reference will be made in disclosing the apparatus operation:

(a) Change-over switches T and M are at inoperative positions. Closure of general switch 30 will operate the thermostats; rocking units 15 will attain the temperature of 37° C. within 10 minutes and the apparatus will be ready to operate.

(b) On blood drawing, pushbutton driving change-over switch T is pressed, with said change-over switch T operating as follows: section $T_1$ puts on lamps 33 illuminating time indicator scale; section $T_2$ drives motor for time indicator 10 directly connecting its main voltage at 220 volts. The test tube, filled with drawn blood, is slipped into seating 21 of the swinging head; pushbutton 13 is pressed so as to actuate change-over switch M, which operates as follows: change-over switch T is returned to inoperative position and the functions accomplished by sections $T_1$ and $T_2$ are now performed by sections $M_1$ and $M_2$; section $M_1$ keeps lamps 33 put on; section $M_2$ keeps motor 10 operating by connecting it to mains through photo-relay 34; section $M_3$ drives motor 16 for rocking head 15 by connecting it to mains through photorelay 34; section $M_4$ supplies voltage to photorelay by connecting it to its stabilized feeder 35. At this stage of operation, the photorelay is disconnected and its contact 36 is closed so as to provide voltage to motors 10 and 16.

(c) Operation of rocking head 15. Motor 16 is provided with a reduction gear 16', the outlet shaft of which performs a revolution per minute. It drives cam 17 which, through eccentric 18, causes said rocking head 15 to angularly move through 90° in counterclock direction carrying the test-tube to a horizontal position with return to the original vertical position taking about ten seconds in each minute. At horizontal position, head 15 operates microswitch 26' which puts on lamp 23; now the two following events may occur: blood is not coagulated, thus taking a horizontal position along the test-tube will intercept the light beam from the lamp, photo-relay 34 controlled by photoelectric cell 24 is de-energized and the cycle continues. The blood is coagulated and is adhering to the bottom of the test-tube; the light beam passes through the test-tube and strikes the photoelectric cell 24 which stops motors 10 and 16 by opening contact 36. At this point, the cycle is terminated, the pointer 11 of the time indicator is at a stop on the time searched for, said time corresponding to the coagulation time for the blood being examined.

(d) Cycle is interrupted with the head 15 at a horizontal position. In order to bring it to a vertical position so as to remove the test-tube and in the case to start a new cycle, a pushbutton (not shown) is pressed, mechanically connected to T and M and bringing M back to inoperative position. T has already been brought back to such a position by pressing M. Thus, voltage is lacking at photorelay 34, which on de-energizing will close contact 36 again and connect motor 16 to feed voltage through microswitch 26 normally closed; when the rocking head 15 returns to a vertical position, it will open microswitch 26 and motor 16 will be stopped.

What is claimed is:

1. A method of measuring the coagulation time of albuminoid liquids and the like comprising the steps of:

(a) partially filling a test tube with the liquid in an uncoagulated state;

(b) orienting the test tube with the liquid therein in a substantially vertical position for a predetermined period of time;

(c) pivoting the test tube into a substantially horizontal position and maintaining the test tube in this position for a predetermined length of time;

(d) passing a light beam diametrically through the test tube at a position along the test tube that is above the level of the liquid when the test tube is vertical;

(e) sensing any light passing through the test tube that is not blocked by the liquid;

(f) returning the test tube to its vertical position;

(g) repeating steps (b)–(e) until the liquid has coagulated and does not block the light beam passing through the test tube; and (h) mechanically correlating steps (b)–(g) with the time required to complete the same to indicate the total coagulation time of the liquid.

2. The method of claim 1 further including the step of maintaining the liquid at a substantially constant temperature during the coagulation time.

3. The method of claim 2 wherein the albuminoid liquid is whole blood and the blood is maintained at a temperature of 37° C.

4. Apparatus for measuring the coagulation time of albuminoid liquids and the like in a partially filled test tube comprising:

(a) first means for supporting the test tube;

(b) second means for positioning said first means to orient the test tube in a vertical position and for pivoting said first means to position the test tube in a horizontal position;

(c) detecting means positioned about the test tube for indicating the flow of the liquid in the test tube when the test tube is moved from said vertical to said horizontal position;

(d) timing means; and (e) control means for causing said second means to position said first means so that the test tube is in said vertical position for a predetermined period of time, pivoting said first means so that the test tube is in said horizontal position and maintaining the test tube in said horizontal position for a predetermined period of time, actuating said detecting means when the test tube is in said horizontal position, returning said first means so that the test tube is in said vertical position, repeating the above movements and actuations until said detecting means indicates no liquid flow in the test tube, and activating said timing means when the test tube is placed in said first means and de-activating said timing means when said detecting means indicates no liquid flow in the test tube to indicate the time required for the liquid to coagulate.

5. The apparatus of claim 4 wherein said detecting means includes a light source positioned in said first means adjacent the test tube when the test tube is carried by the first means and above the level of the liquid when the test tube is in said vertical position, and a photoelectric cell positioned on the opposite side of the test tube from said light source and activated by light from said light source passing through said test tube; and wherein said control means causes light to be emitted from said light source toward the test tube and said photoelectric cell when the test tube is in said horizontal position.

6. The apparatus of claim 5 wherein said first means includes a support, a rocking member defining a seat therein for receiving the test tube rotatably carried by said support, a drive motor carried by said support, and an eccentric cam arrangement connecting said motor to said rocking member to periodically move said rocking member for pivoting the test tube from said vertical position to said horizontal position.

7. The apparatus of claim 6 wherein said control means includes a switch activated by said rocking member when the test tube is in said horizontal position, said switch being connected to said light source to cause said light source to emit light therefrom when activated, and further including heating means for maintaining the test tube at a predetermined temperature.

8. The apparatus of claim 7 wherein the heating means includes a mercury double-contact thermometer switch constructed and arranged to cause the heating means to maintain the test tube at 37° C.

9. The apparatus of claim 6 wherein said seat is oriented at right angles to the rotational axis of said rocking member, and wherein said rocking member defines a conduit connecting said seat, said light source and said photo-electric cell and is positioned at right angles to said seat and the rotational axis of said rocking member.

10. The apparatus of claim 6 wherein said control means is constructed and arranged to pivot the test tube approximately one time per minute, and to pivot the test tube to said horizontal position and back to said vertical position in approximately 10 seconds.

11. The method of claim 1 wherein step (h) is initiated at the beginning of the coagulation process of the liquid.

12. The apparatus of claim 4 wherein said control means includes switch means for activating said timing means at the beginning of the coagulation process of the liquid.

References Cited

The following references, cited by the Examiner, are of record in the patented file of this patent or the original patent.

UNITED STATES PATENTS

| | | | |
|---|---|---|---|
| 2,478,785 | 8/1949 | Shapiro | 73—64.1 |
| 2,878,715 | 3/1959 | Rhees | 73—64.1 |
| 3,106,090 | 10/1963 | Barnes | 73—64.1 |
| 3,119,253 | 1/1964 | LeVacher | 73—64.1 |
| 3,158,445 | 11/1964 | Huff | 73—64.1 UX |
| 3,302,452 | 2/1967 | Leslie | 73—64.1 |
| 3,307,392 | 3/1967 | Owen et al. | 73—64.1 |

RICHARD C. QUEISSER, Primary Examiner

J. W. ROSKOS, Assistant Examiner

U.S. Cl. X.R.

356—39